United States Patent [19]

Thomas et al.

[11] Patent Number: 5,392,191
[45] Date of Patent: Feb. 21, 1995

[54] TRANSITION METAL OXIDE ANODES FOR AQUEOUS PSEUDOCAPACITORS

[75] Inventors: George Thomas; Sathya Prasad, both of Plantation, Fla.; John E. Nerz, Hawthorn Woods, Ill.

[73] Assignee: Motorola, Inc., Schaumburg, Ill.

[21] Appl. No.: 285,677

[22] Filed: Aug. 4, 1994

[51] Int. Cl.⁶ ................... H01G 1/005; H01G 9/04
[52] U.S. Cl. ........................... 361/508; 361/502
[58] Field of Search ............. 361/502, 508, 528; 29/25.03; 204/291, 292

[56] References Cited

U.S. PATENT DOCUMENTS 3,665,260  5/1972  Kirkpatrick ............... 29/25.03
3,849,124  11/1974 Villani ...................... 29/25.03
4,020,401  4/1977  Cannon ..................... 29/25.03
4,422,917  12/1983 Hayfield .................... 204/196
5,173,215  12/1992 Clarke ....................... 252/520

FOREIGN PATENT DOCUMENTS 0078404  9/1982  European Pat. Off. .... H01M 14/00

Primary Examiner—Bruce A. Reynolds
Assistant Examiner—Michael D. Switzer
Attorney, Agent, or Firm—Kenneth M. Massaroni

[57] ABSTRACT

High energy density aqueous pseudocapacitors may be achieved by providing such devices with dissimilar transition metal oxide electrodes. The transition metal oxide electrodes are particularly adapted for use as the anode (20) of a pseudocapacitor device (10).

6 Claims, 5 Drawing Sheets

TRANSITION METAL OXIDE ANODES FOR AQUEOUS PSEUDOCAPACITORS

TECHNICAL FIELD

This invention relates in general to the field of electrochemical capacitors and more particularly to anode materials for such devices.

BACKGROUND

Electrochemical capacitors are a class of high-rate energy storage devices which use electrolytes and electrodes of various kinds in a system similar to that of conventional batteries. Electrochemical capacitors, like batteries, are essentially energy storage devices. However, unlike batteries, they rely on charge accumulation at the electrode/electrolyte interface to store energy. Charge storage in electrochemical capacitors therefore is a surface phenomenon. Conversely, charge storage in batteries is a bulk phenomenon occurring within the bulk of the electrode material.

Electrochemical capacitors can generally be divided into one of two subcategories: Double layer capacitors in which the interfacial capacitance at the electrode/electrolyte interface can be modeled as two parallel sheets of charge; and pseudocapacitor devices in which charge transfer between the electrolyte and the electrode occurs over a wide potential range, and is the result of primary, secondary, and tertiary oxidation/reduction reactions between the electrode and the electrolyte. These types of electrochemical capacitors are being developed for high-pulse power applications.

Most of the known pseudocapacitor active materials are based on metal elements such as platinum, iridium, ruthenium, or cobalt. These materials are generally quite expensive and pose a significant hurdle to the wide-spread commercialization of this technology. Moreover, the use of two electrodes fabricated of similar materials in a symmetric configuration and having redox potentials in a relatively narrow voltage range restricts the cell voltage and hence the deliverable energy density. That is, the voltage ranges are small and hence the commercial applicability of the device is limited.

Moreover, most electrode materials known for pseudocapacitor devices have their redox reactions occurring at positive potentials relative to a mercury/mercury oxide (Hg/HgO) reference electrode. That is they are generally only applicable for cathode applications.

The use of two dissimilar electrodes having redox potentials in a wide voltage range extends the cell voltage in the asymmetric configuration and hence leads to higher deliverable energy. The need for new pseudocapacitor active materials that could be used as either anodes with redox reactions occurring at negative potentials or cathodes with redox reactions occurring at positive potentials in asymmetric pseudocapacitors is the driving force to explore materials that are inexpensive in cost, processable and non-toxic in nature.

Accordingly, there exists a need for pseudocapacitive anode materials characterized by redox reactions occurring at negative potentials relative to a Hg/HgO reference electrode in an aqueous electrolyte. Moreover, such materials should be abundant in nature, inexpensive in cost, readily processable into devices, and non-toxic.

DETAILED DESCRIPTION OF THE PREFERRED EMBODIMENTS

Figure 1:
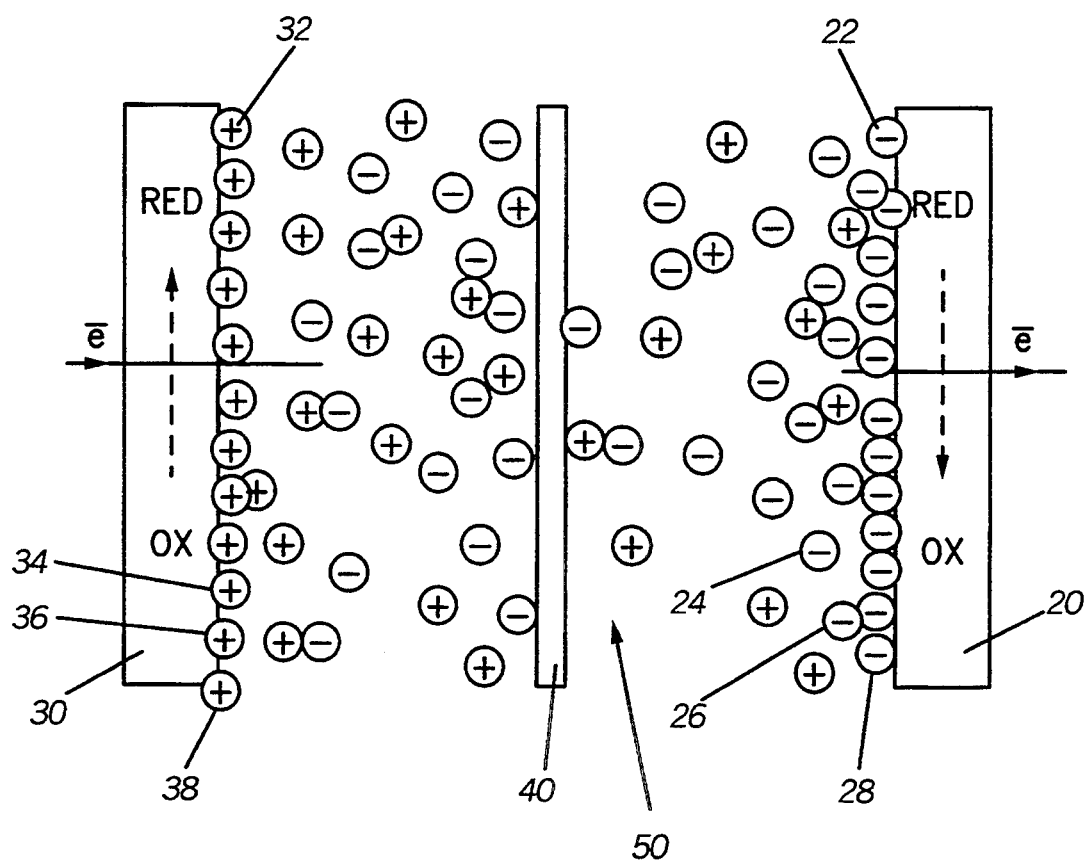
FIG. 1 is a schematic representation of a high-energy density pseudocapacitor in accordance with the instant invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided an anode material for an aqueous electrochemical capacitor, said material having the formula:

$$TM_aO_bX_c$$

wherein TM is a transitional metal element selected from the group consisting of scandium, yttrium, lanthanum, zirconium, titanium, hafnium, niobium, tantalum, and combinations thereof; O is oxygen, and X is a modifying element such as a group IIA metal or a group VIA or VIIA element. In particular, X may be a halogen, such as fluorine, chlorine, bromine, iodine, and combinations thereof. The terms a, b, and c, define the relative proportions of each component in the anode material. Accordingly, a is between 0.1 and 3.0; b is between 1.0 and 7.0; c is between 0.0 and 5.0.

The anode material may also be a multi-phase anode material having at least one phase which is amorphous. More than one phase may be amorphous or, alternatively other phases may be microcrystalline, polycrystalline or crystalline. The material may also be present in the salt form, and hence include lithium, sodium, potassium, rubidium, cesium and combinations thereof.

In a preferred embodiment, the modifying element, X, is chlorine present in proportions up to 25 wt. %. In this embodiment, the modifying anion forms oxyhalide species in such a way that oxygen-metal-halogen, metal-oxygen and metal-halogen combinations of covalent bonds are formed in the electroactive material.

Electrodes fabricated of the inventive material may further include carbonaceous electronic conductivity enhancing materials. This carbonaceous conductivity enhancing material is provided to facilitate the flow of current generated by the material during the electrochemical reactions. Carbonaceous conductivity enhancing material may be present in the material up to 40 wt. % of the total amount of the material. Examples of such conductivity enhancing materials include carbon, graphite, and combinations thereof.

The anode material may also include a binder material to promote adhesion of the anode material into electrodes for electrochemical device. Examples of an appropriate binder material include, for example, Teflon, polyvinyledene fluoride and ethylene propylene diene monomer. The binder material may be present in the anode material at proportions up to 10 wt % of the total anode material.

Referring now to FIG. 1, there is illustrated therein a representation of a high energy density electrochemical capacitor device (10) in accordance with the instant invention. The device (10) includes an anode (20), a cathode (30) and a separator (40) operatively disposed between the anode and the cathode. Also disposed between the anode (20) and the cathode (30) is an electrolyte (50), which as illustrated in FIG. 1 is an aqueous (liquid) electrolyte disposed entirely about both the anode (20) and the cathode (30).

In one preferred embodiment of the invention, the anode (20) is fabricated of a multi-phase anode material such as that described herein above. The cathode material may be fabricated from any of a number of different cathode materials known in the art. Examples of such cathode materials include vanadium oxides, chromium oxides, manganese oxides, iron oxides, cobalt oxides, nickel oxides or their corresponding sulfides, selenides, tellurides and combinations thereof. In one preferred embodiment of the invention, the cathode material is $CoO_2$.

The electrolyte used in connection with the electrochemical capacitor device in accordance with the invention may be any aqueous electrolyte, such as alkaline electrolyte or acid electrolyte and combinations thereof. In one preferred embodiment, the electrolyte is 31% KOH. Similarly the separator (40) may be fabricated of a number of known separator materials as are practiced in the art. Specific examples of such separators include porous cellulose, porous silica, glass wool, glass fiber, polypropylene, and combinations thereof.

The schematic representation of the capacitor device as shown in FIG. 1 is used to explain the redox processes occurring at the anode and the cathode. During charging, electrons, for example, (22, 24, 26, 28), flow to the anode (20) as shown. During charging, electrons flow to the anode and the active material from which the anode is formed undergoes a reduction process. The resulting charge imbalance, here, an excess of negative charge, is balanced by the migration of positively charged ions (32, 34, 36, 38) from the electrolyte to electrode (30) as shown. While the reduction process occurs at the anode, a complimentary oxidation process takes place at the cathode, resulting in the ejection of an electron. Both the electrode processes occur at or near the electrode/electrolyte interface. During this process, ions pass through the porous separator (40). The entire scenario is then reversed during the discharge process of the pseudocapacitor electrodes.

EXAMPLES

The invention is further discussed by offering specific examples of the anode material. Surface bound electrochemistry is one of the characteristics of pseudocapacitance discussed herein.

Thermal treatment of yttrium compounds such as acetates, carbonates, halides, oxalates, nitrates, sulfate, hydroxide, etc. may yield non-stoichiometric $YO_x$ species. Non-stoichiometric $YO_x$ was prepared by heat treating $YCl_3 \cdot 6H_2O$ at 500° C. for 24 hours. In this method, a known amount of the starting material was heated in a silica crucible in the presence of air using a temperature controlled box furnace. The sample was then slowly cooled to room temperature. Using this method, a number of materials were prepared. These included: $YO_{1.86}Cl$, $YO_{1.68}Cl_{0.68}$, $YO_{2.0}Cl_{0.07}$, $YO_{1.86}Cl_{0.03}$, $YO_{2.07}Cl_{0.06}$, and $YO1.64$.

The sample was then powdered using a mortar and pestle. Complete characterization of this compound was carried out by using X-ray diffraction (XRD), energy dispersion spectroscopy (EDS), and x-ray photoelectron spectroscopy (XPS) techniques. It was found that the $YCl_3$ sample transforms into a non-stoichiometric oxide with some amount of bound-chlorine (O—Y—Cl) present, though the role of chlorine in the electrochemistry of the $YO_x$ is not conclusively determined. Elemental analysis of the final compound showed an O/Y ratio of 1.8. This particular sample was found to be pseudocapacitive.

Figure 2:
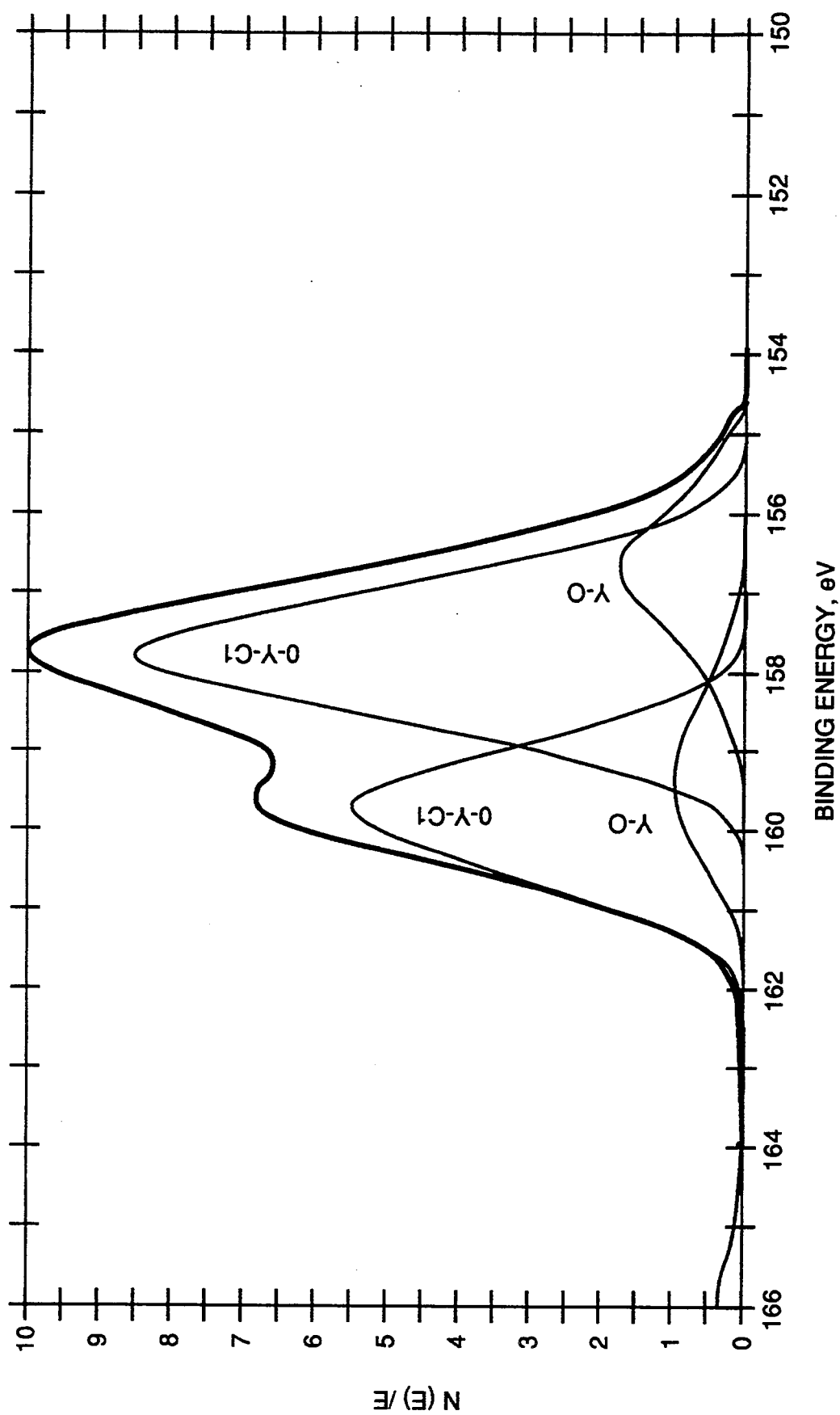
FIG. 2 is an x-ray photoelectron spectroscopy profile of a material in accordance with the instant invention.

Referring now to FIG. 2, there is illustrated therein the XPS profile of a $YO_x$ material as described above. As may be appreciated from a perusal of FIG. 2, binding energy from O—Y—Cl ionic bonding is illustrating by peaks 50 and 52. This indicates the presence of Cl in the $YO_x$ material.

Electrochemistry of YOx

The electrochemical behavior of $YO_x$ compounds prepared as described above from $YCl_3$ was studied by using cyclic voltammetric (CV) techniques. CV is one of the well known techniques to study pseudocapacitance of a material and is reliable in predicting the characteristics of the electrochemistry of the material, such as redox potential, charge density, cycle life, electrochemical stability window, voltage range of activity, etc. However, converting resistive material into an electrode is not trivial in most cases. In the case of $YO_x$ powder this has been achieved by making multi-phase material composite electrodes by adding an electronic conductivity enhancer as described above. Composite electrodes were prepared in different compositions using two different methods. Binders (as described above) were also added to the material in order to prepare electrodes from the powdered YOx sample. The composite material was pressed into a pellet or pressed onto both sides of a standard nickel current collector. The procedure involves the spreading of the active material on a fiat stainless steel plate and placing a nickel mesh on top of the material. Thereafter, another layer of active material is spread atop the nickel mesh. The sandwich structure is pressed together with a lab press and onto another nickel mesh supported electrode structure similar to that described hereinabove. Electrochemistry of YOx was studied by using these types of electrodes and in both cases found them pseudocapacitive in their electrochemical behavior as discussed below:

Type 1 Composite Electrodes

Preparation

The $YO_x$ powder was mixed with equal amounts of graphite (6μm) using a mortar and pestle. The resulting mixture was intimately mixed with 5% Teflon binder. The compositions were by weight % and the resulting composite was pressed into thin sheets. Two small pieces were cut out and placed on both sides of a nickel mesh electrode substrate and pressed. About 5 g of the active material($YO_{2.07}Cl_{0.07}$) were mixed well with approximately 5 g of graphite. To this was added approximately 0.75 g of the Teflon binder. Two 5 mm test samples were cut out of the pressed flat sheet, and pressed onto both sides of the nickel mesh current collector. The active material of the test sample was calculated to be 0.031 g.

Cyclic voltammetry

Figure 3:
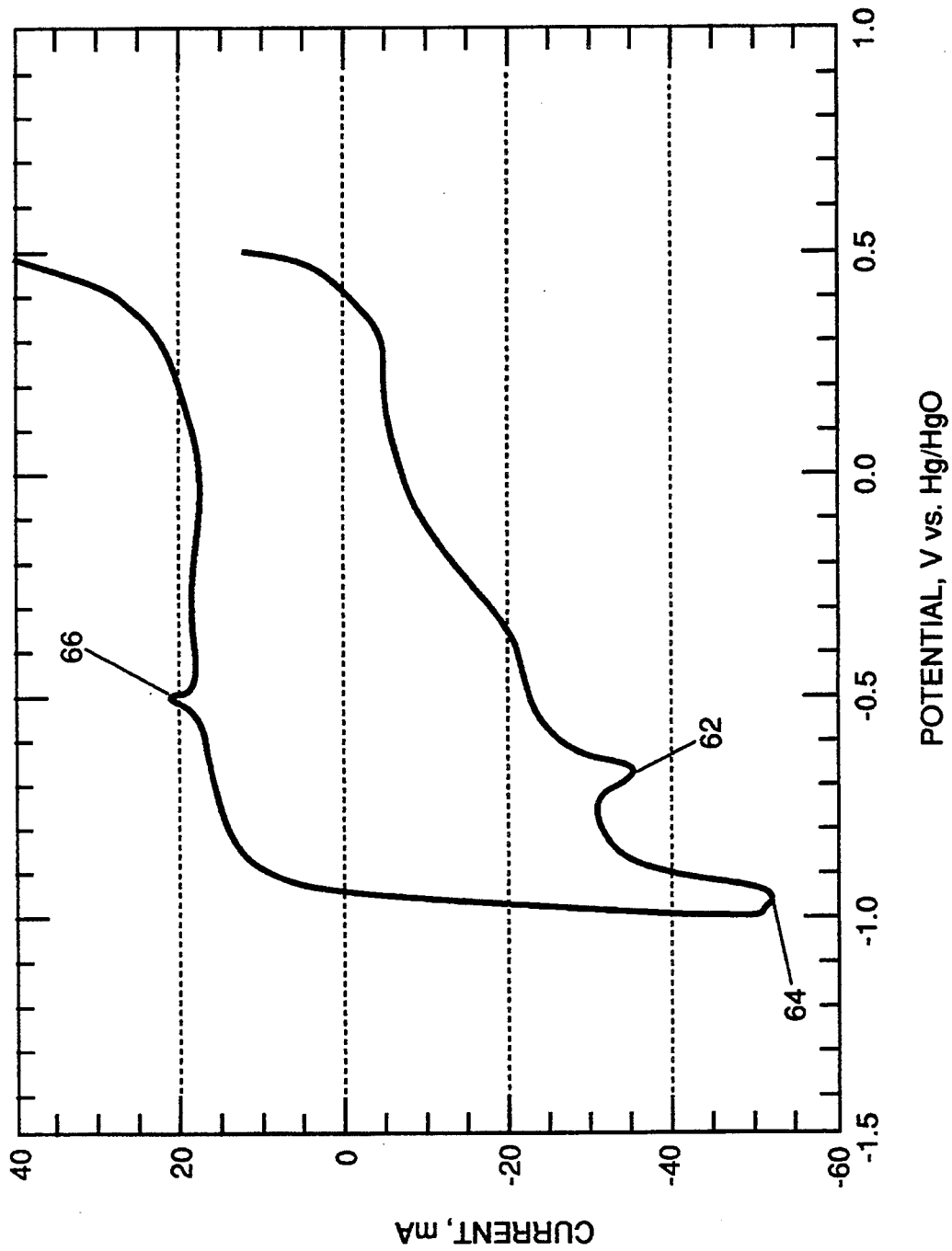
FIG. 3 is a cyclic voltammagram of a $YO_x$ electrode in 31% KOH electrolyte recorded at 50 mV/s sweep rate, fabricated in accordance with the instant invention.

Cyclic voltammetry of these samples were recorded at 20–100 mV/s sweep rate between −1.3 and 0.2 V voltage range in 31% KOH electrolyte. FIG. 3 shows the typical CV profile obtained with this type of electrode. Two cathodic peaks (62, and 64) are observed at ∼0.65 V and ∼0.95 V, respectively, while the anodic peak (66) appears at ∼0.5 V vs. Hg/HgO reference electrode. As seen in FIG. 2, the sample shows reversible mirror image behavior, a characteristic of pseudocapacitive behavior, in the cyclic voltammagrams at sweep rates in excess of 20 mV/s. By comparison, the common battery materials show reversible CV behavior at scan rates lower than 5 mV/s. Multi-cycling experiments showed the stability of the $YO_x$ material, another criteria for a pseudocapacitive electrode.

Type 2 Composite Electrode

In this case, the composite was prepared by mixing $YO_x$,($YO_{1.68}Cl_{0.68}$) with a conductivity enhancer known in the art as SuperP carbon, and Teflon binder, in the weight per cent ratio of 85:10:5 respectively. The mixture was ground in a mortar with a pestle and a small portion of the material was transferred into a pelletizing die (1.2 cm dia) and pressed under 6000 kg/cm$^2$ for 1–2 minutes to form a highly compressed pellet. The pellet was then heated at 120° C. for ∼10 minutes to remove any adsorbed water.

Cyclic voltammetry

The electrodes were attached to a silver foil (0.1 mm thick, 99.999% pure) flag current collector by using silver epoxy. Freshly prepared 31% KOH electrolyte was used for the study. Cyclic voltammetric experiments were carried out with electrodes of two different thickness, but same surface area. In the first case, a 3 mm thick electrode was studied. The potential of the electrode was cycled between 0.2 and −1.3 V vs. Hg/HgO reference electrode at various sweep rates (10 mV/s–200 mV/s). Multicycle experiments were also performed. The CV profile was similar to that showed in FIG. 2. (It should be noted that the silver is inactive in the potential range of interest to $YO_x$.) Electrochemistry of the electrode with 1 mm thickness was also studied in the same way and at various sweep rates. It is interesting to note that CVs recorded using two electrodes of different thicknesses yielded almost same charge. Since these pellets are compacted under heavy pressure it is reasonable to assume very low porosity for these electrodes and hence the electro-activity is believed to have originated at the surface of the electrode. Assuming surface reaction, the data collected from various sweep rates was tabulated and is presented in the table below:

| Sweep Rate Charge (mV/s) | Anodic Charge (C/cm$^2$) | Cathodic Charge (C/cm$^2$) | % Change |
|---|---|---|---|
| 20 | 0.12 | 0.15 | 0 |
| 50 | 0.1 | 0.1 | −20 |
| 100 | 0.07 | 0.07 | −45 |

-continued

| Sweep Rate Charge (mV/s) | Anodic Charge (C/cm$^2$) | Cathodic Charge (C/cm$^2$) | % Change |
|---|---|---|---|
| 200 | 0.06 | 0.06 | −52 |

A control experiment was conducted with a pellet made with SuperP carbon and the binder alone in the same way as that of YOx material. However, no redox peaks were observed in the cyclic voltammetric experiments. This demonstrates that the peaks seen in FIG. 3 are due to the redox reaction of the $YO_x$ material. This observation was confirmed when a CV of the resistive $YO_x$ material was studied by making it into a thin pellet. Though the CV showed the expected IR effect, redox peaks were seen in the same negative voltage range similar to $YO_x$ composite electrode.

In another example of a metal oxide belonging to the group mentioned earlier, zirconium oxide ($ZrO_2$) obtained from commercial sources was also found to be pseudocapacitive. The electrochemistry of finely powdered $ZrO_2$ samples (with particle sizes in the submicron range), was studied in aqueous electrolyte for pseudocapacitance.

Figure 4:
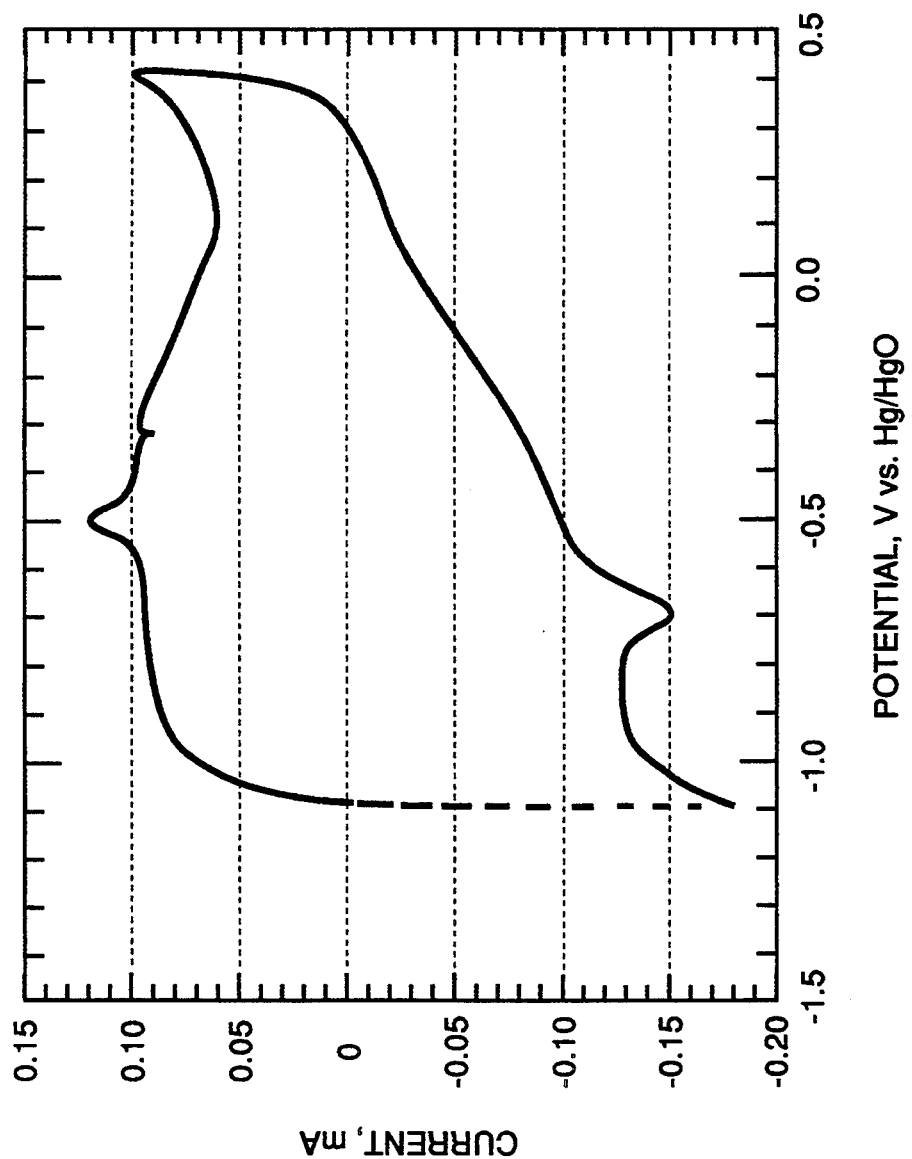
FIG. 4 is a cyclic voltammagram of $ZrO_2$ electrode in 31% KOH electrolyte recorded at 50 mV/s sweep rate, fabricated in accordance with the instant invention.

In one of the experiments, the finely powdered powder was packed into the micro-cavity of a micro-electrode and the CV was recorded at various scan rates such as 20, 50, 100, and 200 mV/s using 31% KOH electrolyte. Micro-electrodes are used in the art to study the electrochemistry of very small amounts of powder materials with very low electronic conductivity. The amount of powder used in these experiments were in the range of microgram. A typical CV profile of $ZrO_2$ powder in 31% KOH is shown in FIG. 4. As seen in the figure, this material also exhibits reversible redox chemistry in the negative voltage region with reference to Hg/HgO electrode. This behavior is similar to that observed from the YOx. Moreover, the anodic and cathodic peaks occurred in substantially the same region.

Figure 5:
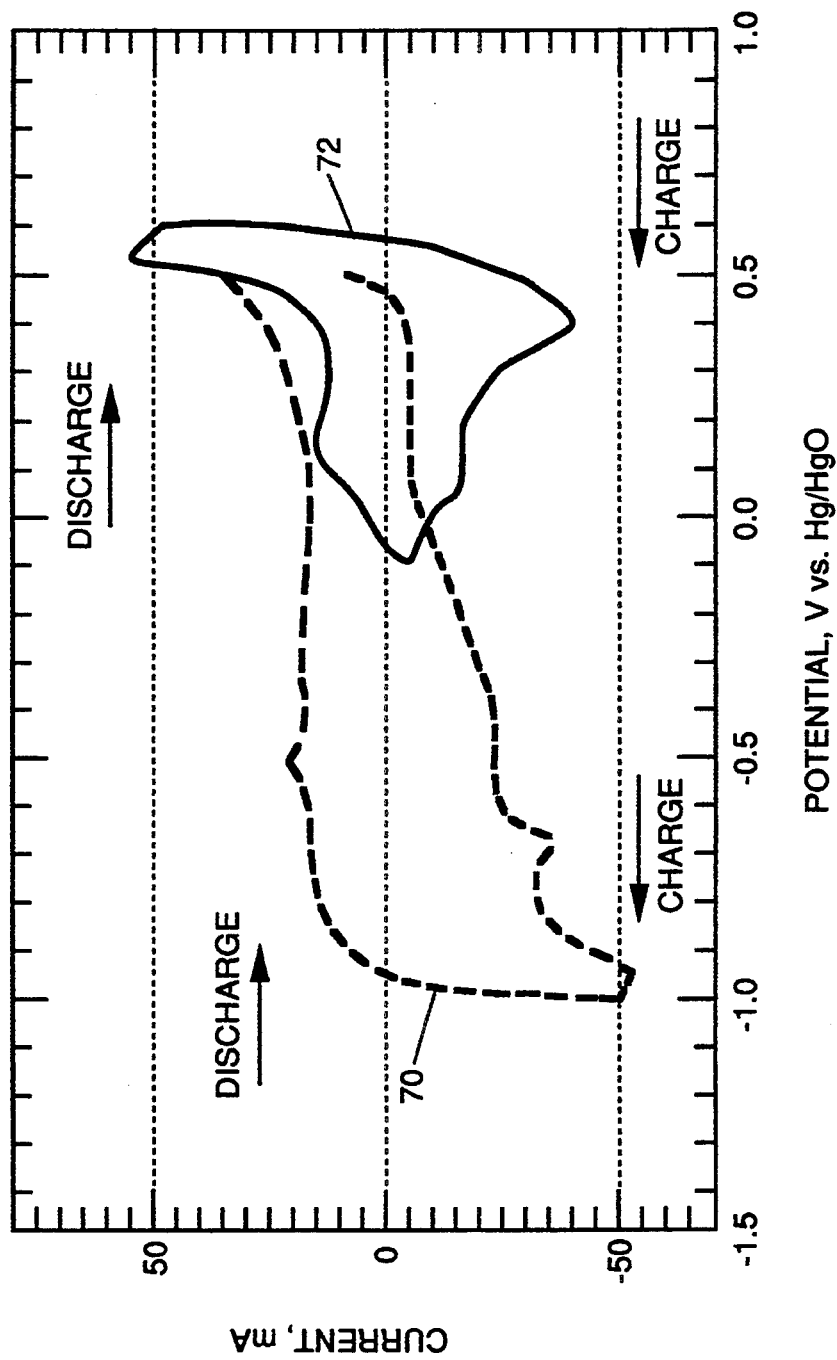
FIG. 5 is an overlay plot of the cyclic voltammagrams of YOx and CoOx electrodes in 31% KOH electrolyte at the same sweep rate.

The most interesting feature in the cyclic voltammagrams of YOx and $ZrO_2$ oxides is the negative voltage at which the material is electroactive. This indicates that this material could be used as an anode in a pseudocapacitor with asymmetric configuration as discussed in FIG. 1. On the contrary, other known pseudocapacitive materials such as cobalt oxide ($CoO_x$) or metallic glass alloys show pseudocapacitance in the positive potentials vs. Hg/HgO electrode in the same electrolyte making them potential cathodes in a pseudocapacitor device. This concept is more evident when cyclic voltammagrams of $YO_x$ and $CoO_x$ materials are plotted together as shown in FIG. 5. As seen in FIG. 5, the voltage of the $YO_x$ (illustrated by trace 70) would shift to more negative potentials on a constant current charging of a pseudocapacitor built with $YO_x$ as anode and $CoO_x$ as cathode while the potential of the $CoO_x$ (illustrated by trace 72) shift to more positive potentials. Since both $YO_x$ and $CoO_x$ are high rate electrochemical systems, as evidenced by the fast (>50 mV/s) CVs, the device would be able to store and deliver charge at fast rates, a requirement of a pseudocapacitor.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A multiphase anode material for an aqueous electrochemical capacitor, having at least one amorphous phase and having the formula:

$$TM_a O_b X_c$$

wherein TM is a transition metal selected from the group of Y, Zr, Ti, Hf, Nb, Sc and combinations thereof; O is oxygen; X is a modifier element selected from the group consisting of fluorine, chlorine, bromine, iodine, and combinations thereof; and a is between 0.1 and 3.0, b is between 1.0 and 7.0, and c is between 0.0 and 5.0.

2. An anode material as in claim 1, further including a carbonaceous current collecting material.

3. An anode material as in claim 2, wherein said carbonaceous current collecting material is present in said anode material up to 50 wt%.

4. An anode material as in claim 1, further including a binder material.

5. An anode material as in claim 4, wherein said binder is present in said anode material up to 10 wt. %.

6. An anode material as in claim 1, wherein said modifying element is chlorine.

* * * * *